US012639621B2

(12) United States Patent
Freed et al.

(10) Patent No.: US 12,639,621 B2
(45) Date of Patent: May 26, 2026

(54) AUTOMATED GENERATION OF A MACHINE LEARNING MODEL FROM COMPUTATIONAL SIMULATION DATA

(71) Applicant: OnScale, Inc., Redwood City, CA (US)

(72) Inventors: David M. Freed, Burlingame, CA (US); Ian Campbell, San Jose, CA (US)

(73) Assignee: ANSYS, INC., Canonsburg, PA (US)

( * ) Notice: Subject to any disclaimer, the term of this patent is extended or adjusted under 35 U.S.C. 154(b) by 1111 days.

(21) Appl. No.: 17/490,352

(22) Filed: Sep. 30, 2021

(65) Prior Publication Data

US 2022/0101198 A1     Mar. 31, 2022

Related U.S. Application Data

(60) Provisional application No. 63/085,504, filed on Sep. 30, 2020.

(51) Int. Cl.
*G06N 20/00* (2019.01)

(52) U.S. Cl.
CPC ................................... *G06N 20/00* (2019.01)

(58) Field of Classification Search
CPC .......... G06F 30/27; G06F 30/23; G06F 30/20; G06N 20/00
See application file for complete search history.

(56) References Cited

U.S. PATENT DOCUMENTS

| | | | | |
|---|---|---|---|---|
| 6,208,982 B1 * | 3/2001 | Allen, Jr. | ................ | G06F 30/00 |
| | | | | 706/15 |
| 11,213,946 B1 * | 1/2022 | Bai | ...................... | G05D 1/0221 |

| | | | | |
|---|---|---|---|---|
| 2012/0310618 A1 | 12/2012 | B'Far et al. | | |
| 2014/0079314 A1 | 3/2014 | Yakubovich et al. | | |
| 2016/0096272 A1 * | 4/2016 | Smith | .................... | B25J 9/1697 |
| | | | | 700/255 |
| 2020/0034745 A1 * | 1/2020 | Nagpal | .................. | G06N 5/022 |
| 2020/0166909 A1 * | 5/2020 | Noone | ................... | G06N 20/00 |
| 2020/0272139 A1 * | 8/2020 | Rakuff | ................. | G06F 17/142 |
| 2020/0342148 A1 | 10/2020 | Banks et al. | | |
| 2021/0033748 A1 * | 2/2021 | Rowan | ................... | G06F 30/28 |
| 2021/0063999 A1 * | 3/2021 | Kim | ...................... | G06N 20/00 |

(Continued)

FOREIGN PATENT DOCUMENTS

| | | |
|---|---|---|
| WO | 2017/217957 | 12/2017 |

OTHER PUBLICATIONS

International Search Report and Written Opinion dated Dec. 28, 2021, from International Application No. PCT/US2021/052800, 12 pages.

(Continued)

*Primary Examiner* — Andrew T Chiusano
(74) *Attorney, Agent, or Firm* — Douglas A. Gastright

(57)     ABSTRACT

Systems and methods for automatically training a machine learning model are described herein. An example method includes performing a set of computational simulations; and assembling a data set associated with the set of computational simulations. The data set includes data associated with at least one simulation result for at least one computational simulation in the set of computational simulations. The method also includes training a machine learning model with the data set. At least one feature and at least one target for the machine learning model are part of the data set.

2 Claims, 4 Drawing Sheets

400

(56)                    References Cited

U.S. PATENT DOCUMENTS

2022/0066408 A1*    3/2022  Allison .............. G05B 23/0221
2023/0044533 A1*    2/2023  Horie ..................... G06F 30/12

OTHER PUBLICATIONS

Ganti Himakar et al: "Data-driven surrogate modeling of multiphase flows using machine learning techniques", Computers and Fluids, vol. 211, Jun. 13, 2020 (Jun. 13, 2020), p. 104626, XP093206541, GB ISSN: 0045-7930, DOI: 10.1016/j.compfluid.2020.104626, abstract and pp. 1-12.
Packard Corey D et al: "Automated simulation-generated EO/IR image library for artificial intelligence applications", SPIE Proceedings; [Proceedings of SPIE ISSN 0277-786X], SPIE, US, vol. 11406, Apr. 23, 2020 (Apr. 23, 2020), pp. 1140606-1140606, XP060132400, DOI: 10.1117/12.2558843, ISBN: 978-1-5106-3673-6.
European Search Report in corresponding EP App. No. 21876453.8-1203, mailed Sep. 30, 2024 (9 pages).

* cited by examiner

Perform a set of computational simulations
102

Assemble a data set associated with the set of computational simulations
104

Train a machine learning model with the data set associated with the set of
computational simulations
106

200

202

System Memory
204

Processing Unit
206

Removable Storage
208

Non-Removable Storage
210

Output Device(s)
212

Input Device(s)
214

Network Connection(s)
216

| | Simulation Inputs | | Simulation Results | | |
|---|---|---|---|---|---|
| | Condition 1: Force Magnitude applied to Surface A | Condition 2: Heat Flux applied to Surface B | Sensor 1: Strain measured at point X | Sensor 2: Temperature measured at point Y | Sensor 3: Temperature measured at point Z |
| Simulation 1 | 100 | 24 | 57 | 33 | 56 |
| Simulation 2 | 200 | 24 | 68 | 42 | 58 |
| Simulation 3 | 100 | 36 | 66 | 37 | 71 |
| ... | ... | ... | ... | ... | ... |
| ML Model 1: | Feature | Target | Feature | Feature | Feature |
| ML Model 2: | Target | Feature | Feature | Feature | Feature |

*FIG. 3*

AUTOMATED GENERATION OF A MACHINE LEARNING MODEL FROM COMPUTATIONAL SIMULATION DATA

BACKGROUND

Computer-aided engineering (CAE) is the practice of simulating representations of physical objects using computational methods including, but not limited to, finite element method (FEM) and finite difference method (FDM). To perform simulations using FEM and/or FDM, the domain must be discretized into a finite number of elements called a mesh. FEM and FDM are techniques for converting differential equations (e.g., partial differential equations (PDEs)) into a system of equations that can be solved numerically.

Machine learning, which is a branch of artificial intelligence, facilitates a system's ability to automatically "learn" from experience. In some cases, the system can learn without human intervention. Machine learning requires large amounts of data to train the algorithms.

SUMMARY

Systems and methods for automatically generating a machine learning model from computational simulation data are described herein.

An example method for automatically training a machine learning model is described herein. The method includes performing a set of computational simulations; and assembling a data set associated with the set of computational simulations. The data set includes data associated with at least one simulation result for at least one computational simulation in the set of computational simulations. The method also includes training a machine learning model with the data set. At least one feature and at least one target for the machine learning model are part of the data set.

Additionally, the data set further includes data associated with at least one simulation input for the at least one computational simulation in the set of computational simulations.

In some implementations, the method further includes receiving an input specification related to the at least one simulation input from a user.

In some implementations, the method further includes receiving a result specification related to the at least one simulation result from a user.

Alternatively or additionally, the at least one simulation input for the at least one computational simulation in the set of computational simulations includes a parameterized variable. Optionally, the parameterized variable is a parameterized condition at a location on a simulation model. Alternatively or additionally, the parameterized variable is optionally a parameterized characteristic of a simulation model.

Alternatively or additionally, the at least one simulation result for the at least one computational simulation in the set of computational simulations includes a calculated property at a location on a simulation model. Optionally, the calculated property represents an output of a measurement device.

In some implementations, the method further receiving a target specification related to the at least one target for the machine learning model from a user. Optionally, the at least one target is a simulation input or a simulation result.

In some implementations, the method further includes receiving a feature specification related to the at least one feature for the machine learning model from a user. Optionally, the at least one feature is a simulation input or a simulation result.

In some implementations, the step of training a machine learning model with the data set includes training a plurality of machine learning models with the data set. Optionally, the machine learning models are trained in parallel. Alternatively or additionally, the method further includes evaluating performance of each of the trained machine learning models.

Alternatively or additionally, the trained machine learning model is configured to predict a condition, property, or behavior of a physical system based on at least one measurement obtained by a measurement device of the physical system.

Alternatively or additionally, the machine learning model is a supervised learning model, a semi-supervised learning model, or an unsupervised learning model. Optionally, the machine learning model is a deep learning model. Optionally, the machine learning model is an artificial neural network.

In some implementations, the set of computational simulations and the machine learning model training are performed until a stop criteria is reached. Optionally, the stop criteria is a predetermined performance level of the trained machine learning model, a predetermined number of simulations, a predetermined number of computational core hours, or a predetermined cost.

In some implementations, the method further includes providing the trained machine learning model to a user. For example, the method optionally includes transmitting the trained machine learning model's architecture, hyperparameter values, and/or parameter values to the user.

Alternatively or additionally, the data set further comprises real data associated with a physical system. Optionally, the real data is measured by at least one measurement device of the physical system.

An example system is described herein. The system includes a device including a network of measurement devices, a machine learning module, and a controller. The machine learning module is trained with a data set, where the data set includes data associated with at least one simulation result for at least one computational simulation in a set of computational simulations, and where at least one feature and at least one target for the machine learning model are part of the data set. The controller includes a processor and a memory having computer-executable instructions stored thereon. The controller is configured to receive respective measurements from the network of measurement devices, input the respective measurements into the machine learning module, and receive an output predicted by the machine learning module, where the output is a condition, property, or behavior of the device.

Additionally, the data set further includes data associated with at least one simulation input for the at least one computational simulation in the set of computational simulations.

Alternatively or additionally, the at least one simulation input for the at least one computational simulation in the set of computational simulations includes a parameterized variable. Optionally, the parameterized variable is a parameterized condition at a location on a simulation model. Alternatively or additionally, the parameterized variable is optionally a parameterized characteristic of a simulation model.

Alternatively or additionally, the at least one simulation result for the at least one computational simulation in the set of computational simulations includes a calculated property at a location on a simulation model. Optionally, the calculated property represents an output of at least one measurement device the network of measurement devices.

Alternatively or additionally, the trained machine learning model is configured to predict a condition, property, or behavior of a physical system based on at least one measurement obtained by obtained by the network of measurement devices.

Alternatively or additionally, the machine learning model is a supervised learning model, a semi-supervised learning model, or an unsupervised learning model. Optionally, the machine learning model is a deep learning model. Optionally, the machine learning model is an artificial neural network.

Alternatively or additionally, the data set further comprises real data associated with the device. Optionally, the real data is measured by at least the network of measurement devices.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 3 is a table illustrating a synthetic data set according to an implementation described herein.

DETAILED DESCRIPTION

Figure 1:
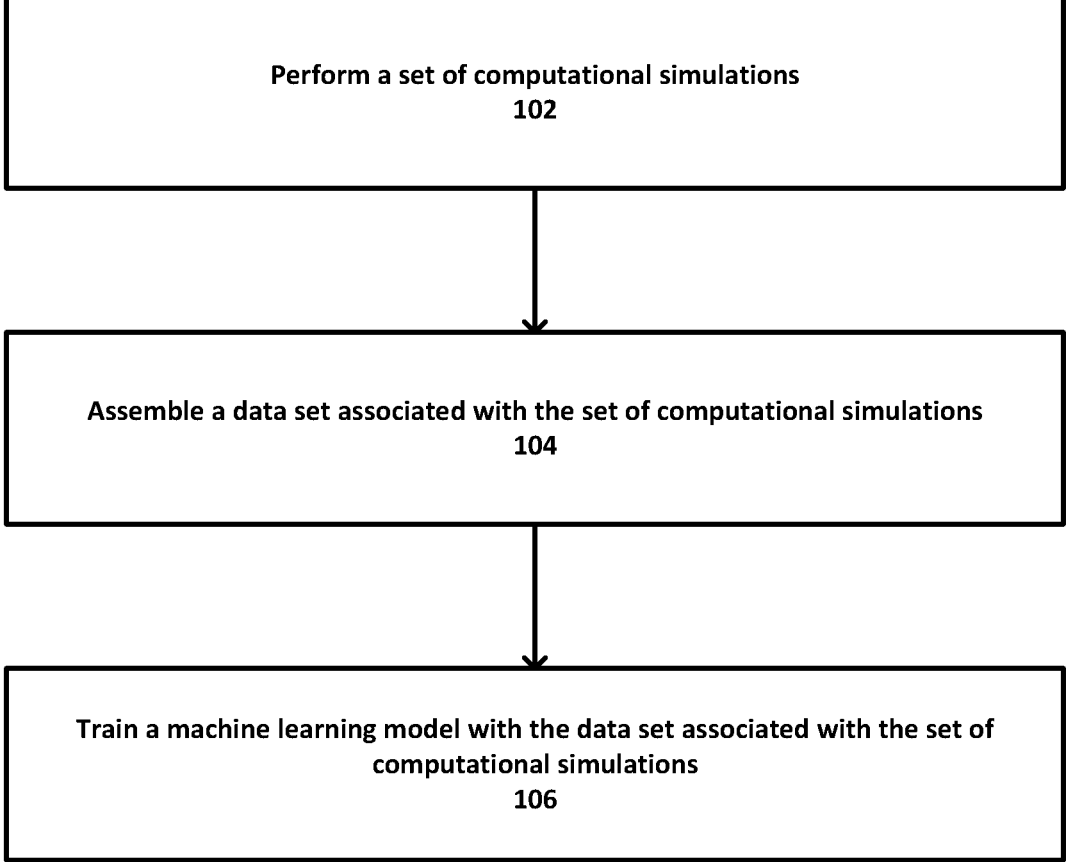
FIG. 1 is a flow chart illustrating example operations for automatically training a machine learning model according to an implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Systems and methods for automatically generating a machine learning model from computational simulation data are described herein. Conventionally, performance of computational simulations has not been integrated with machine learning training processes. As described above, machine learning requires a large data set (sometimes referred to herein as "dataset") for training. It is time-consuming and error-prone to perform a set of computational simulations and manually assemble the resulting computational simulation data set, often referred to as "synthetic data", to train a machine learning model. Raw computational simulation data may be unreliable and therefore unsuitable for model training. For example, raw computational simulation data may be biased, inaccurate, unreliable, and/or ambiguous. Thus, the training data set (and optionally validation and testing data sets) must be deliberately assembled from computational simulation data to serve the particular purpose of the model. This will avoid garbage in, garbage out issues. In conventional systems, data set assembly is a manual process. In contrast, the automated systems and methods described herein are capable of efficiently processing the computational simulation data, assembling a training data set, and then training a machine learning model using the same without user intervention. Such processing can include, but is not limited to, merging data from multiple sources, organizing data, formatting data, cleaning data (e.g., removing unwanted and/or problematic data), extracting data and/or features from data, and labelling data (e.g., tagging the feature(s) and target(s) for a supervised model). As noted above, it should be understood that the computational simulations produce large amounts of data. The automated systems and methods described herein are configured to, among other features, identify a subset of simulation inputs and results, assemble this subset into a training data set, and then train a machine learning model without user intervention. The systems and methods described herein therefore solve the issues present in conventional systems and processes by integrating computational simulation, synthetic data preparation, and machine learning model training into a fully automated process.

Synthetic data generated by a set of simulations can be used to train a machine learning model, for example, a trained machine learning model that is configured to predict one or more conditions acting on a device including a sensor network. For example, consider a network of sensors embedded in a device. The device can be a structure of any kind, and the sensors can be of various types, e.g. the sensor network can include a mix of various types of measurements (temperature, pressure, strain, etc.). One goal for the machine learning model may be to predict, in real-time, one or more conditions acting on the device based on the current measured outputs of the sensor network. For example, in a touchscreen case, the screen is the device, and the device includes a distributed set of strain sensors, which are arranged underneath the screen. The goal for the machine learning model may be to predict the force load locations (due to touch) on the screen based on the actual measured outputs of the distributed set of strain sensors. As described below, the machine learning model is trained using computational simulation data (e.g., a synthetic data set). The trained machine learning model can then be employed in an inference mode to predict the force load locations. It should be understood that real-time prediction of conditions acting on the screen is only an example goal for a machine learning model. This disclosure contemplates other goals for the machine learning model. For example, a goal for the machine learning model may be prediction of a specific outcome (such as structural failure or overheating) based on the measured outputs of the sensor network.

In regards to the goal of predicting one or more conditions acting on the device, a set of simulations of the device can be set up in the usual way, e.g., by specifying geometry, materials, loads/boundary conditions, outputs, etc. The outputs can include the measured property and location of each sensor in the sensor network. For each condition the machine learning model is configured to predict (e.g. pressure or temperature on a surface of a device), a distribution of values for that condition is specified. The set of simulations are then run to interrogate the parameter space for the set of conditions. As the simulations complete, the simulation results are included in a data set. Optionally, the data set can be partitioned into training and validation data sets. Thereafter, the machine learning model is trained (and optionally validated and/or tuned) with the data set. Optionally, analysis of the machine learning model can inform the process as to which regions of parameter space to emphasize for further simulations and training. Alternatively or additionally, the set of simulations can optionally continue until a stop criteria is reached. Example stop criteria can include, but are not limited to, machine learning model performance reaches an acceptable threshold, number of simulations exceeds a threshold, monetary cost exceeds a threshold, and/or number of computational core hours used exceeds a threshold.

Referring now to FIG. 1, a flow chart illustrating example operations for automatically training a machine learning model is shown. This disclosure contemplates that one or more of the operations shown in FIG. 1 can be performed automatically, e.g., without user input and/or intervention. For example, once the set of simulations begin (e.g., step 102 of FIG. 1), the computational simulation data set is assembled (e.g., step 104 of FIG. 1), and the machine learning model is trained (e.g., step 106 of FIG. 1) without requiring user input or intervention. Optionally, in some implementations, all of the operations shown in FIG. 1 can be performed automatically, e.g., without user input and/or intervention between any step.

At step 102, a set of computational simulations is performed. The set of computational simulations includes those necessary to generate reliable synthetic data that can be used to train a machine learning model. It should be understood that the number, type, and/or size of the set of simulations depends on the nature and purpose of the trained machine learning model. This disclosure contemplates performing the computational simulations with one or more computing devices such as the computing device of FIG. 2. As used herein, a set of computational simulations includes one or more computational simulations. In some implementations, the set of computational simulations is a plurality of computational simulations. This disclosure contemplates that the set of computational simulations is related to a physical system, for example, a device with an embedded sensor network. In the simulations, the physical system is represented by a simulation model (e.g., a two-dimensional or three-dimensional virtual representation of the physical system). Example devices with embedded sensor networks are a touch-sensitive electronic device with a distributed set of strain sensors (see e.g., Example 2) or a device with a distributed set of thermocouples (see e.g., Example 1). It should be understood that these physical systems are provided only as examples. This disclosure contemplates that the physical system can be a structure of any kind and include various types of sensors (e.g., temperature, pressure, strain, current, optical, flow, chemical, acoustic, etc. sensors).

In some implementations, the set of computational simulations can optionally be performed by a cloud-based computing cluster. Example systems and methods for running a simulation using a cloud-based computing cluster are described in U.S. Patent App. Publication No. 2020/0342148, published Oct. 29, 2020, Applicant OnScale, Inc., and titled "SYSTEMS AND METHODS FOR RUNNING A SIMULATION." It should be understood that the systems and methods described herein are not intended to be limited to cloud-based computing implementations. Computational simulations such as FEM and FDM are known in the art and are therefore not described in further detail herein.

Prior to performing the set of simulations, an input specification related to at least one simulation input (described in detail below) is received from a user, for example, at a computing device that integrates computational simulations and machine learning model training. For example, the user can designate which of the simulation inputs should be used for training the machine learning model and provide such information to the computing device. The designated simulation inputs may optionally be a subset (i.e., not all) of the simulation inputs used to perform the set of computational simulations. This disclosure contemplates that the input specification (which includes the designated simulation inputs) can optionally be provided to the computing device via a message, web-based portal, mobile application, etc. Additionally, a result specification related to at least one simulation result (described in detail below) is received from a user, for example, at a computing device that integrates computational simulations and machine learning model training. For example, the user can designate which of the simulation results should be used for training the machine learning model and provide such information to the computing device. The designated simulation results may optionally be a subset (i.e., not all) of the simulation results generated by performing the set of computational simulations. This disclosure contemplates that the result specification (which includes the designated simulation results) can optionally be provided to the computing device via a message, web-based portal, mobile application, etc. In other words, when a user requests a set of computational simulations related to a physical system, the user specifies which of the simulation inputs and/or results are of interest to the user for the purposes of training the machine learning model (see table in FIG. 3, for example). These simulation inputs and/or results (and associated data) form the data set that is used to train a machine learning module. As described below, the at least one target and at least one feature for the machine learning model are contained in this data set.

At step 104, a data set associated with the set of computational simulations is assembled. The data set assembled at step 104 can serve as a training data set, i.e., a data set used to train a machine learning model (see step 106). Optionally, the data set assembled at step 104 can be partitioned into training and validation data sets. It should be understood that a validation data set includes data held back from model training and then used only to measure the model's performance during training. This disclosure contemplates assembling the data set with one or more computing devices such as the computing device of FIG. 2. For example, the data set can optionally be stored in memory of a computing device that integrates computational simulations and machine learning model training, or it can be stored on a hard drive. This disclosure contemplates that the data set can be stored locally or remotely (e.g., accessible over a network) with respect to the computing device. Assembling the data set can include collecting, merging, and/or combining respective computational simulation data from multiple computational simulations. Additionally, assembling the data set may include, but is not limited to, data processing steps to select, rearrange, modify, reduce, normalize, encode, categorize, extend, label, and/or store the data in the data set in order to prepare the data set to be used for training a machine learning model. The objective is to assemble a reliable data set for machine learning model training (see step 106). It should be understood that assembling the data set can include one or more of the data processing steps above, which are provided only as examples. This disclosure contemplates using techniques known in the art for assembling the data set.

As noted above, step 104 can be performed without user input or intervention. In other words, the workflow between steps 102 and 104 can be automated. The data set includes, for each computational simulation in the set of computational simulations, data associated with at least one simulation result. Additionally, the data set optionally includes, for each computational simulation in the set of computational simulations, data associated with at least one simulation input. It should be understood that inputs to a simulation can include, but are not limited to, geometry, materials, and initial/load/boundary conditions that act on the simulation model (e.g., force, heat, current and/or voltage, magnetic field, light, etc.). Methods such as FEM and/or FDM are used to discretize the simulation model's domain into a finite number of elements and convert differential equations into a system of equations that can be solved numerically to produce one or more outputs. Thus, the data associated with the at least one simulation result can be generated by performing the set of computational simulations based on the data associated with the at least one simulation input. Data associated with simulation inputs and results is sometimes referred to herein as "synthetic" data because it is generated by computer simulation rather than by physical experiment. As described below, one or more machine learning models can be trained with the synthetic data.

As used herein, a simulation input for which associated data is included in the synthetic data set comprises a parameterized variable. A parameterized variable is a parameter whose value may vary from simulation-to-simulation. Optionally, the parameterized variable is a parameterized condition at a location of the simulation model (e.g., at a point, edge, surface, or volume of the model). Conditions can include, but are not limited to, force, displacement, pressure, traction, velocity, mass flux, momentum, dynamic pressure, temperature, heat flux, power, current, voltage, and magnetic field strength. It should be understood that the above conditions are provided only as examples. For example, this disclosure contemplates that other conditions, generally derived from the examples, are possible. Additionally, a condition can be one of three types: load condition, boundary condition, initial condition. Alternatively, the parameterized variable is optionally a parameterized characteristic of the simulation model. Characteristics can include properties of the simulation model that are not conditions such as a material or geometric property. It should be understood that the above characteristics are provided only as examples. In some implementations, the at least one simulation input for each computational simulation includes a single parameterized variable. In other implementations, the at least one simulation input for each computational simulation includes multiple parameterized variables.

As used herein, a simulation result for which associated data is included in the synthetic data set comprises a calculated property at a location of the simulation model (e.g., at a point, edge, surface, or volume of the model). Properties can include, but are not limited to, stress, strain, displacement, temperature, heat flux, velocity, static pressure, dynamic pressure, current, voltage, and power. It should be understood that the above properties are provided only as examples. This disclosure contemplates that other properties can be output by the set of simulations. In some implementations, the calculated property represents an output of a measurement device. A sensor (e.g., strain sensor, temperature sensor) is an example measurement device. In some implementations, the at least one simulation result includes a single calculated property. In other implementations, the at least one simulation result includes multiple calculated properties.

Referring now to FIG. 3, a table illustrating an example synthetic data set is shown. The simulation inputs include Force Magnitude applied to Surface A (Condition 1) and Heat Flux applied to Surface B (Condition 2). As discussed above, these simulation inputs have been designated by a user for training a machine learning model. It should be understood that the number and/or types of simulations inputs in the table are provided only as examples. For example, more or less than two simulation inputs can be designated by the user. Conditions 1 and 2 are parameterized variables, e.g., their values may vary from simulation-to-simulation. It should be understood that the number of simulations in the table is provided only as an example. The simulation results include Strain measured at point X (Sensor 1), Temperature measured at point Y (Sensor 2), and Temperature measured at point Z (Sensor 3). As discussed above, these simulation results have been designated by a user for training a machine learning model. It should be understood that the number and/or types of simulations results in the table are provided only as examples. For example, more or less than three simulation results can be designated by the user. The simulation results are calculated properties at locations of the simulation model.

Referring again to FIG. 1, at step 106, a machine learning model is trained with the data set associated with the set of computational simulations. This disclosure contemplates that the machine learning model can be implemented with one or more computing devices such as the computing device of FIG. 2. As noted above, step 106 can be performed without user input or intervention. In other words, the workflow between steps 104 and 106 can be automated. Machine learning models are trained with a data set such as the data set assembled at step 104. During training, weights, biases, parameters, rewards (e.g., Q-values), etc. associated with the machine learning model are adjusted to minimize a cost function. Once complete, the trained machine learning model is configured for inference mode, e.g., the trained machine learning model can make predictions based upon new data. For example, the trained machine learning model can be configured to predict a condition, property, or behavior (e.g., outcome such as structural failure or overheating) of the physical system based on at least one measurement obtained by a measurement device of the physical system. In some implementations, the machine learning model is a classifier model, e.g., configured to categorize the model input into one of 'n' categories. In other implementations, the machine learning model is a regression model, e.g., configured to estimate a value based on model input.

In some implementations, the machine learning model can optionally be a neural network. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can optionally be arranged in a plurality of layers such as input layer, output layer, and one or more hidden layers. Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement n activation function (e.g., binary step, linear, sigmoid, tan H, or rectified linear unit (ReLU) function), and provide an output in accordance with the activation function. Additionally, each node is associated with a respective weight. ANNs are trained with a data set (e.g., the computational simulation data set described herein) to minimize the cost function, which is a measure of the ANN's performance. Training algorithms include, but are not limited to, backpropagation. The training algorithm tunes the node weights and/or bias to minimize the cost function. It should be understood that any algorithm that finds the minimum of the cost function can be used to for training the ANN. It should be understood that a neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

In some implementations, the machine learning model is trained with synthetic data (e.g., data associated with the simulation inputs and/or results as described above). Optionally, in other implementations, the data set further includes real data associated with the physical system. Optionally, such real data is measured by at least one measurement device of the physical system. In other words, the data set, which includes synthetic data, can be supplemented with real data. This disclosure contemplates that supplementing the data set with real data (e.g., actual real world measurements) may improve the machine learning model's performance.

Prior to training, a target specification related to at least one target and a feature specification related to at least one feature for the machine learning model are received from a user, for example, at a computing device that integrates computational simulations and machine learning model training. As described below, the at least one target and at least one feature are part of the data set assembled at step 104. For example, the user can designate which of the simulation inputs and/or results in the data set assembled at step 104 is the machine learning model target (or targets) and provide such information to the computing device. Additionally, the user can designate which of the simulation inputs and/or results in the data set assembled at step 104 is the machine learning model feature (or features) and provide such information to the computing device. This disclosure contemplates that the target and feature specifications can optionally be provided to the computing device via a message, web-based portal, mobile application, etc. Optionally, the target and feature specifications can be provided when the user requests a set of computational simulations related to a physical system, e.g., at the same time the user provides the simulation input and result specifications to the computing device. The at least one target and at least one feature are part of the data set associated with the set of computational simulations. In particular, each of the at least one target and at least one feature is a simulation input or a simulation result in the data set (see table in FIG. 3, for example). In other words, when a user requests a set of computational simulations related to a physical system, the user specifies each one of the simulation inputs and results in the data set (e.g., the data set assembled at step 104) as a target or feature for the purposes of training the machine learning model (see table in FIG. 3, for example). It should be understood that the at least one target is the part of the data set that the machine learning model is to be trained to predict in step 106. For example, the machine learning model can be trained to learn patterns and uncover relationships between the at least one target and the at least one feature in the data set. After training, i.e. when operating in inference mode to analyze new data, the "target" is the output of the trained model and the "features" are the inputs to the trained model.

Referring again to FIG. 3, the table illustrating an example synthetic data set is shown. Each of the Simulation Inputs (Condition 1, Condition 2) and Simulation Results (Sensor 1, Sensor 2, and Sensor 3) is specified as either a target or feature for the machine learning model. For ML Model 1, the user specified Condition 2 as the target and Condition 1, Sensor 1, Sensor 2, and Sensor 3 as the features. ML Model 1 is therefore trained to learn patterns and uncover relationships for predicting Condition 2 when given values for (i.e. as a function of) Condition 1, Sensor 1, Sensor 2, and Sensor 3. For ML Model 2, the user specified Condition 1 as the target and Condition 2, Sensor 1, Sensor 2, and Sensor 3 as the features. ML Model 2 is therefore trained to learn patterns and uncover relationships for predicting Condition 1 when given values for (i.e. as a function of) Condition 2, Sensor 1, Sensor 2, and Sensor 3. As described herein, each of the at least one target and at least one feature is a simulation input or a simulation result from the data set. It should be understood that the at least one target and at least one feature are not limited to those in the table. When a user wishes to use the trained machine learning model to predict a condition based on an actual measurement, it should be understood that the feature(s) would be an output of a measurement device (e.g., a calculated property from the simulation such as Sensor 1, Sensor 2, Sensor 3 in the table) since the actual measurement(s) would be input into the trained machine learning model. It should be understood that the number and/or types of targets, features, and/or ML Models in FIG. 3 are provided only as examples. For example, more or less than two machine learning models can be trained. Alternatively or additionally, more or less than four features of the machine learning model can be specified. Alternatively or additionally, more than one target of the machine learning model can be specified (it should be understood that in practice, specifying multiple targets for one machine learning model is beneficial when they are highly correlated).

In some implementations, a single machine learning model is trained. In other implementations, a plurality of machine learning models are trained. Optionally, the machine learning models are trained in parallel. Alternatively or additionally, performance of each of the trained machine learning models can be evaluated.

In some implementations, the set of computational simulations and the machine learning model training are performed until a stop criteria is reached. Optionally, the stop criteria is a predetermined performance level of the trained machine learning model. In some implementations, the performance level of the trained machine learning model is measured using a validation data set, e.g., data set aside from the training data set. In other implementations, the performance level of the trained machine learning model is measured using a test data set, e.g., data set independent from the training data set. This disclosure contemplates comparing the measured performance level to a threshold (i.e., predetermined performance level).

This disclosure contemplates measuring performance of a machine learning model using techniques known in the art, which include, but are not limited to, mean absolute error, mean squared error, classification accuracy, logarithmic loss, and area under the curve. As described herein, the machine learning model may be a classifier model or a regression model. Classifier model performance can be measured using one or more metrics known to those of skill in the art, which include, but are not limited to accuracy, precision, sensitivity/recall, and specificity metrics. For example, performance of a classifier model can be evaluated by measuring the number of true positives (TP), true negatives (TN), false negatives (FN), and false positives (FP). In some implementations of the present disclosure, accuracy can be measured as $(TN+TP)/(TP+FP+TN+FN)$. Measures of precision can also be used as stop criteria in some implementations. A non-limiting example of a measure of precision that can be used in some implementations is $TP/(TP+FP)$. Similarly, the true positive rate (which can also be referred to as recall or sensitivity) can also be used as a stop criteria. In some implementations the true positive rate can be defined as $TP/(TP+FN)$. Specificity can also be used as a stop criteria in some implementations. An example measure of specificity is $TN/(TN+FP)$. The present disclosure also contemplates that the stop criteria can be visualized or graphed and displayed to the user, for example as a confusion matrix, a ROC (receiver operating characteristic) or PR (precision-recall) curve. It should be understood that the above example metrics for classifier models are intended only as non-limiting examples, and that additional performance metrics will be apparent to those of skill in the art.

Regression model performance can be measured using one or more metrics known to those of skill in the art, which include, but are not limited to mean squared error (MSE), root mean squared error (RSME), and mean absolute error (MAE). The present disclosure also contemplates that the stop criteria can be visualized or graphed and displayed to the user, for example as error curves. It should be understood that the above example metrics for regression models are intended only as non-limiting examples, and that additional performance metrics will be apparent to those of skill in the art.

Alternatively or additionally, the stop criteria may be unrelated to a performance level of the trained machine learning algorithm. For example, the stop criteria can be a predetermined number of simulations, a predetermined monetary cost, a predetermined number of computational core hours, or other predetermined computing cost. It should be understood that the above example stop criteria are intended only as non-limiting examples, and that additional stop criteria will be apparent to those of skill in the art.

In some implementations, the trained machine learning model can be provided to a user. For example, the trained machine learning model's architecture, hyperparameter values, and/or parameter values can be transmitted to the user.

It should be appreciated that the logical operations described herein with respect to the various figures may be implemented (1) as a sequence of computer implemented acts or program modules (i.e., software) running on a computing device (e.g., the computing device described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
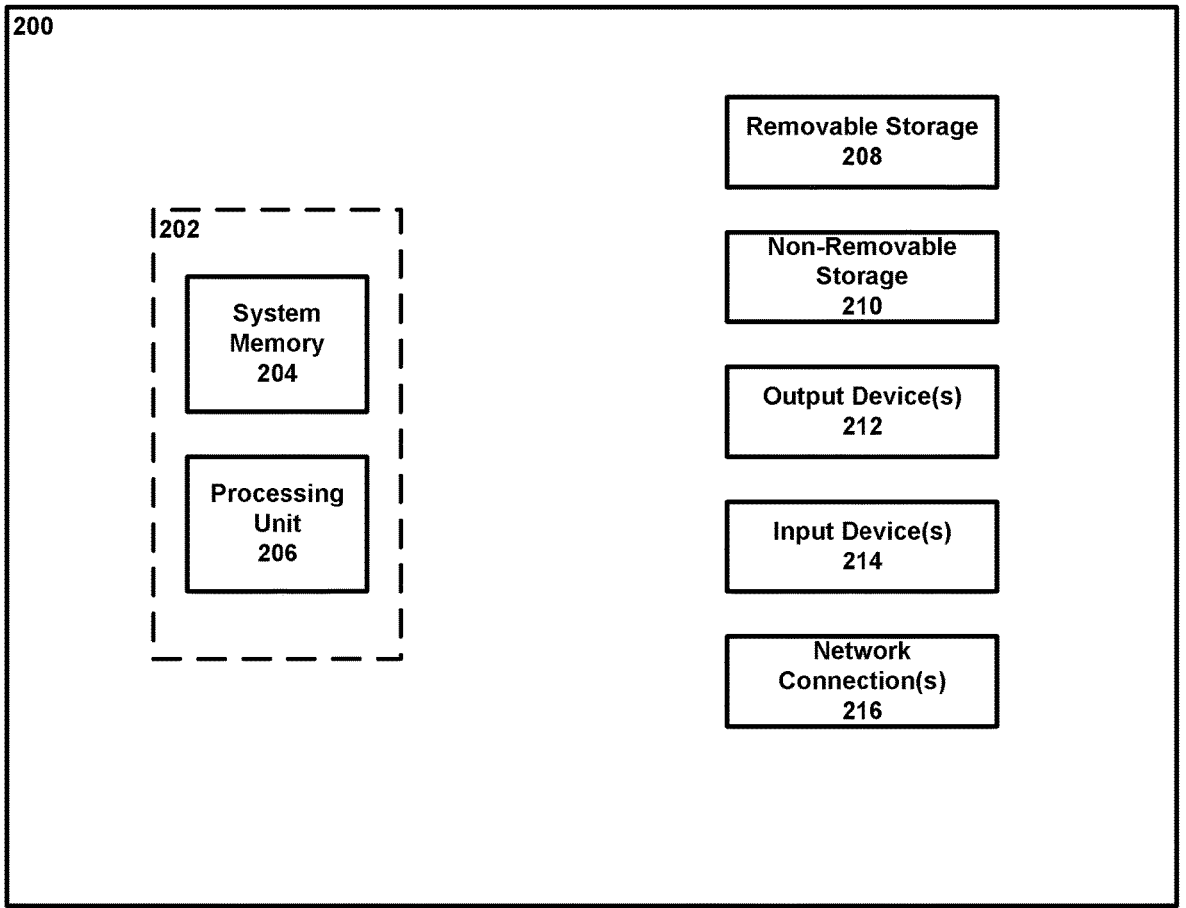
FIG. 2 is an example computing device.

Referring to FIG. 2, an example computing device 200 upon which the methods described herein may be implemented is illustrated. It should be understood that the example computing device 200 is only one example of a suitable computing environment upon which the methods described herein may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 4:
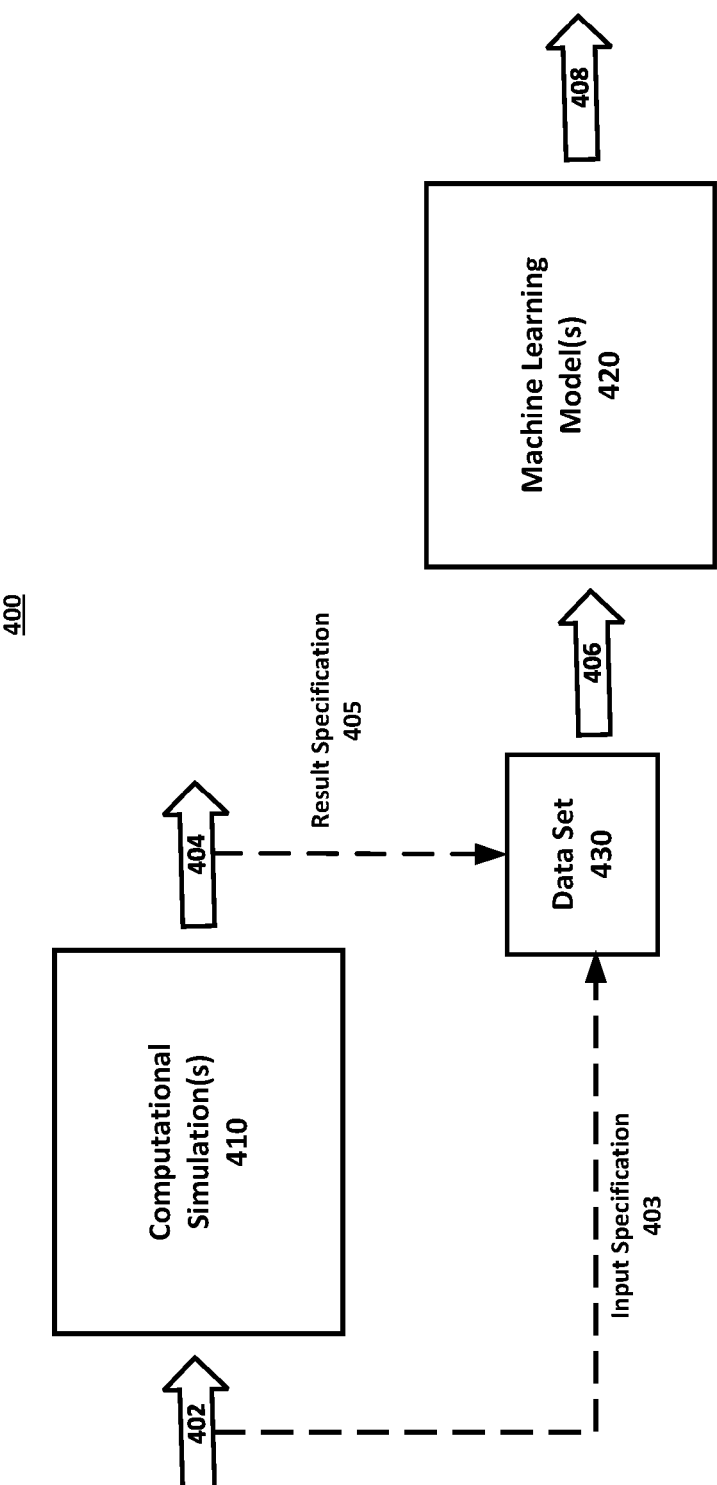
FIG. 4 is a block diagram illustrating an example environment for automatically training a machine learning model according to an implementation described herein.

Referring now to FIG. 4, a block diagram illustrating an example environment 400 for automatically training a machine learning model is shown. As described herein, one or more computational simulations 410 are performed in the environment 400. A computational simulation 410 is related to a physical system and simulates one or more types of physics (e.g., mechanical, electromechanical, electromagnetic, and thermal physics) acting on the physical system.

Simulation input 402 and simulation result 404 are shown in FIG. 4. Simulation inputs include, but are not limited to, the physical system's geometry, materials, initial conditions, load conditions, and boundary conditions. Example simulation inputs are also shown in FIG. 3. Simulation results include a calculated property at a location of the simulation model (e.g., at a point, edge, surface, or volume of the model). Properties can include, but are not limited to, stress, strain, displacement, temperature, heat flux, velocity, static pressure, dynamic pressure, current, voltage, and power. Example simulation results are also shown in FIG. 3. A computational simulation 410 is performed by specifying simulation input 402 and calculating simulation result 404.

Additionally, as described herein, one or more machine learning models 420 are trained in the environment 400. A machine learning model 420 is trained using a data set 430, which is associated with one or more computational simulations 410 (e.g., the synthetic data). For example, a machine learning model can be any supervised learning model, semi-supervised learning model, or unsupervised learning model, optionally a supervised learning model such as a deep learning model. After training with synthetic data, the machine learning model is configured to predict a condition, property, or behavior of the physical system based on actual measurement(s) obtained by the physical system.

As described herein, input specification 403 specifies or designates which data from the simulation input 402 is included in the data set 430, which is used for training a machine learning model 420. Additionally, result specification 405 specifies or designates which data from the simulation result 404 is included in the data set 430, which is used for training a machine learning model 420. The designated data forms data set 430. It should be understood that the designated simulation inputs and designated simulation results may optionally be a subset (e.g., not all) of the simulations inputs and results from one or more computational simulations 410. Additionally, it should be understood that the data set can include only designated simulation results in some implementations or both designated simulation inputs and results in other implementations.

As described herein, feature and target specifications can be provided by a user. Feature and target specifications specify or designate which data contained in the data set 430 is a machine learning model feature 406 and which data contained in the data set 430 is a machine learning model target 408. Example feature and target specifications for two machine learning models are shown in FIG. 3.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

Example 1

An example implementation of the present disclosure is described below. In this example, the device (e.g., the physical system) includes a plurality of thermocouples (e.g., the measurement devices), which are distributed around the exterior of the device. Each thermocouple measures a respective temperature at its exterior location of the device with a sampling rate, for example, 10 measurements per second. The device also includes an interior component that is required to remain below a certain temperature. Due to the device's design, however, it is not possible to measure temperature in the device's interior. It is therefore not possible, for example using a thermocouple, to monitor the temperature of the interior component and avoid a high-temperature condition. Instead, a machine learning model can be trained to predict the temperature of the interior component based on the exterior thermocouple measurements. Once trained, the machine learning model can be used in inference mode as part of a control system that adjusts operation of the device when the predicted temperature of the interior component exceeds the high-temperature threshold. As described herein, the machine learning model can be trained using synthetic data obtained through a set of computational simulations.

In this example, an automated method can be used to perform a set of computational simulations (e.g., FIG. 1, step 102; FIG. 4, computational simulation(s) 410). In this example, the set of computational simulations is referred to as a "study" and performing the set of computational simulations that makes up the study can optionally be performed as a batch (e.g. one after the other, or concurrently).

The set of computational simulations is based on the simulation input (e.g., FIG. 4, simulation input 402) specified by the user. In this example, the simulation input includes a CAD (computer aided design) model of the device, information about the material properties of the components of the device, and information about the properties and locations of applied conditions such as the initial, load, and/or boundary conditions. The set of computational simulations can be performed based on the simulation input to calculate the simulation result (e.g., FIG. 4, simulation result 404).

In this example, the applied conditions can represent a physical effect that is applied to the CAD model, which includes information about the sizes, shapes, and arrangements of the device's components. Each applied condition can be defined by a position (or location) that the applied condition acts on and one or more properties of the applied condition. For example, the applied conditions can include ambient temperature and the power output of a component of the device. The ambient temperature applied condition can be defined to have a position outside of the device (i.e. "ambient" to the device), and the property of the ambient temperature can be a temperature value. The applied condition of the power output of a component of the device can have a location associated with the component of the device, and the power output can have a property representing the rate of energy conversion (i.e. its power output), which is related to heat dissipation.

Additionally, in this example, the properties of the applied conditions can be parameterized. For example, the power output of the component of the device can be parameterized with 50 specified values, and the ambient temperature can also be parameterized with 20 specified values.

As discussed above, the set of computational simulations can calculate the simulation result (e.g., FIG. 4, simulation result 404). In this example, the simulation result can include the temperature at each thermocouple location and the temperature of the interior component of the device. Therefore, in this example, a simulation can be performed for every combination of the parameterized variable values and a simulation result can be calculated for each combination of parameterized variable values. Therefore in this example, a computational simulation can be performed for each of the 1000 combinations of the parameterized value representing the power output of the component and the parameterized value representing the ambient temperature (i.e. 50×20=1000). For each computational simulation, the temperature at each of the thermocouples located on the device, as well as the temperature of the interior component of the device, can be simulated. The temperatures of the thermocouples correspond to the "calculated properties" described above with reference to FIG. 1. Therefore the 1000 computational simulations performed result in calculation of the temperature at each of the thermocouples and the temperature of the interior component of the device, for each of the combinations of parameterized values. The temperature at each thermocouple location and the interior component temperature can be described as the simulation results of the simulation.

In this example, the simulation results for the 1000 simulations can be assembled (e.g., FIG. 1, step 104) into a data set (e.g., FIG. 4, data set 430). As discussed herein, the data set may include only a subset of the simulation inputs and/or simulation results. For example, the user can specify which data from the simulation inputs and/or simulation results (e.g., FIG. 4, input specification 403 and result specification 405) should be included in the data set, which is then used for training a machine learning model. In this example, assembling the data set can include combining the simulation results of each simulation into the data set. The data set can therefore include the thermocouple location temperatures and the interior component temperatures from each of the 1000 simulations. In this example the data set includes only simulation results, not simulation input. In this example, the data set can then be used to train a machine learning model (e.g., FIG. 1, step 106; FIG. 4, machine learning model(s) 420). In this example, the simulation results representing the temperature at each thermocouple location can be the features of the machine learning model (e.g., FIG. 4, model features 406), and the simulation results representing the interior component temperature can be the target of the machine learning model (e.g., FIG. 4, model target 408).

The present example contemplates that the performance of the trained machine learning model can be determined during training. As described herein, performance can be measured using known metrics such as accuracy, precision, sensitivity/recall, and specificity for classifier models or error for regression models. It is possible to iteratively improve performance of the machine learning model. For example, as described below, steps can be taken to improve performance of the model in response to user inputs/commands (e.g., by tuning the model), or in response to determining that model performance is less than a predetermined threshold value. Once the machine learning model is trained using the data set, the machine learning model is considered a trained machine learning model, which can be used in inference mode. The trained learning model can be stored in a file (e.g. a computer file) and/or transmitted to the user.

To improve the performance of the model, any one or more of steps 102, 104, and 106 illustrated in FIG. 1 can be repeated. To repeat step 102 of FIG. 1, additional combinations of parameterized variable values can be selected and additional simulations corresponding to the additional combinations of parameterized variable values can be performed. The additional simulations can be based on the same CAD model as the initial simulations. Similarly, the additional simulations calculate the temperature at each of the thermocouples and the temperature of the interior component of the device, for each of the additional combinations of parameterized values.

To repeat step 104 of FIG. 1, the results of the additional simulations ("additional simulation results") can be added to the data set to form a new or augmented data set assembled from the existing data set and new simulation results (the "increased dataset").

To repeat step 106 of FIG. 1, the machine learning model can be retrained using the increased dataset. The performance of the machine learning model that has been trained again can then be reassessed. Alternatively or additionally, it should be understood that the machine learning model can optionally be tuned or refined at step 106, e.g., by modifying the model's hyperparameters.

These steps of selecting new parameter values, performing new simulations based on the new parameter values, retraining the machine learning model with a larger data set, measuring performance of the retrained model, and deciding whether the performance of the model is sufficient can be performed more than once. For example, these steps can be performed repeatedly until the performance value reaches the threshold value. Alternatively or additionally, these steps can be repeated until the cost (e.g., monetary, computing such as number of simulations or core hours, etc.) of the steps exceeds a cost threshold.

Example 2

Another example implementation of the present disclosure is described below. In this example, the device (e.g., the physical system) is an electronic device that includes a panel with a plurality of strain sensors (e.g., the measurement devices), which are attached to and distributed around the underside of the panel. Each strain sensor measures a respective strain at its location due to an object (e.g., instrument or user's finger) making contact with the user-facing surface of the panel. A machine learning model can be trained to predict the location and pressure of the object based on the strain sensor measurements. Once trained, the machine learning model can be used in inference mode as part of a control system, for example, to accept user input to the device and react accordingly. As described herein, the machine learning model can be trained using synthetic data obtained through a set of computational simulations.

Similar to the example above, an automated method can be used to perform a set of computational simulations (e.g., FIG. 1, step 102; FIG. 4, computational simulation(s) 410). The set of computational simulations is referred to as a "study" and performing the set of computational simulations that makes up the study can optionally be performed as a batch (e.g. one after the other, or concurrently). The set of computational simulations is based on the simulation input (e.g., FIG. 4, simulation input 402) specified by the user. In this example, the simulation input includes a CAD (computer aided design) model of the device, information about the material properties of the components of the device, and information about the properties and locations of applied conditions such as the initial, load, and/or boundary conditions. The set of computational simulations can be performed based on the simulation input to calculate the simulation result (e.g., FIG. 4, simulation result 404).

Similar to the example above, the applied conditions can represent a physical effect that is applied to the CAD model, which includes information about the sizes, shapes, and arrangements of the device's components. Each applied condition can be defined by a position (or location) that the applied condition acts on and one or more properties of the applied condition. For example, the applied conditions can include a first touch location on the panel of the device, a second touch location on the panel of the device, a first touch pressure, and a second touch pressure. The first touch location can be a parameterized variable with 100 possible values, and the second touch location can be a parameterized variable with 100 possible values. The first touch pressure can be a parameterized variable with a minimum value and a maximum value, and the second touch pressure can be a parameterized variable with a minimum value and a maximum value.

As discussed above, the set of computational simulations can calculate the simulation result (e.g., FIG. 4, simulation result 404). In this example, the simulation result can include the strain at each strain sensor of the device. Therefore, in this example, a simulation can be performed for combinations of the applied conditions (e.g., first and second touch locations and first and second touch pressures) and a simulation result can be calculated for each combination. For example, parameterized variable values can be selected for combinations of the applied conditions to generate simulation results. Optionally, in this example, a computational simulation can be performed for each of N random combinations of the applied conditions (for example N=50,000). It should be understood that N=50,000 is provided only as an example. For each computational simulation, the strain at each strain sensor of the device can be simulated. The strains at each strain sensor correspond to the "calculated properties" described above with reference to FIG. 1.

Similar to the example above, the simulation results for the 50,000 simulations can be assembled (e.g., FIG. 1, step 104) into a data set (e.g., FIG. 4, data set 430). As discussed herein, the data set may include only a subset of the simulation inputs and/or simulation results. For example, the user can specify which data from the simulation inputs and/or simulation results (e.g., FIG. 4, input specification 403 and result specification 405) should be included in the data set, which is then used for training a machine learning model. In this example, assembling the data set can include combining both the simulation input and result of each simulation into the data set. The data set can therefore include the four applied conditions (e.g., the parameterized variable values for randomly selected combinations of touch locations and touch pressures) as well as calculated strain values from each of the 50,000 simulations. Optionally, the data set can be analyzed and cleaned, for example, to detect and remove (or modify to realistic values) calculated strain values that exceed the operating range of a strain sensor.

In this example, the data set can then be used to train a machine learning model (e.g., FIG. 1, step 106; FIG. 4, machine learning model(s) 420). In this example, the simulation results representing the stain at each of the strain sensors can be the features of the machine learning model (e.g., FIG. 4, model features 406), and the simulation inputs representing the four applied conditions can be the target of the machine learning model (e.g., FIG. 4, model target 408). This is different than Example 1 above because, in Example 2, the targets of the machine learning model (i.e., what the model predicts) are the simulation input (i.e., the applied conditions) for the simulation.

Similar to the example above, the present example contemplates that the performance of the trained machine learning model can be determined during training, for example, using metrics such as accuracy, precision, sensitivity/recall, and specificity for classifier models or error for regression models. And once the machine learning model is trained using the data set, the machine learning model is considered a trained machine learning model, which can be used in inference mode. The trained learning model can be stored in a file (e.g. a computer file) and/or transmitted to the user.

Similar to the example above, to improve the performance of the model, any one or more of steps 102, 104, and 106 illustrated in FIG. 1 can be repeated in the same manner as described above in Example 1. Additionally, the steps of selecting new parameter values, performing new simulations based on the new parameter values, retraining the machine learning model with a larger data set, measuring performance of the retrained model, and deciding whether the performance of the model is sufficient can be performed more than once. For example, these steps can be performed repeatedly until the performance value reaches the threshold value. Alternatively or additionally, these steps can be repeated until the cost (e.g., monetary, computing such as number of simulations or core hours, etc.) of the steps exceeds a cost threshold.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for automatically training a machine learning model, comprising:
   (a) receiving a simulation input from a user, wherein the simulation input comprises a model representing a physical system, a set of material properties associated with the model, and an applied condition that describes a condition configured to be applied to the model during a simulation;
   (b) determining, for the applied condition, a parameter range for each of two or more variables associated with the applied condition, including a first variable and a second variable, wherein the parameter range describes a plurality of parameter values that are potential values for the two or more variables associated with the applied condition;
   (c) automatically performing a set of computational simulations based on a plurality of (c) combinations of parameterized variable values for each of the two or more variables to produce a set of simulation results, wherein the set of simulation results comprises, for each result, a resulting condition that corresponds to the applied condition when simulated with that combination of parameterized variable values, wherein the resulting condition comprises one or more resulting variables;
   (d) assembling a data set based on the set of simulation results, wherein the data set describes, for each of the set of computational simulations, input values of the two or more variables associated with the applied condition for that simulation, and output values associated with the resulting condition for that simulation;
   (e) receiving, from a user, a specification that designates two or more features and a target from the data set, wherein each of the target and the two or more features are distinct, and wherein the target and the two or more features are selected from the two or more variables associated with the applied condition and the one or more resulting variables associated with the resulting condition; and
   (d) training a machine learning model with the data set according to the specification, wherein the machine learning model when trained is configured to predict a value of the target based on the value of the two or more features.

2. The method of claim 1, further comprising, when automatically performing the set of computational simulations based on the plurality of combinations of parameterized variable values:
   (a) after performing one or more of the set of computational simulations, training and testing the machine learning model to determine whether a stop criteria has been reached based on an analysis of the predicted value of the target and a configured accuracy threshold associated with the stop criteria; and
   (b) where the stop criteria has not been reached, continue performing the set of computational simulations, and training and testing the machine learning model, until the stop criteria has been reached.

* * * * *